(12) United States Patent
Wouters

(10) Patent No.: US 8,764,309 B2
(45) Date of Patent: Jul. 1, 2014

(54) QUICK RELEASE CONNECTION

(71) Applicant: Applied Optical Systems, Inc., Plano, TX (US)

(72) Inventor: Vincent A. Wouters, McKinney, TX (US)

(73) Assignee: Applied Optical Systems, Inc., Plano, TX (US)

( * ) Notice: Subject to any disclaimer, the term of this patent is extended or adjusted under 35 U.S.C. 154(b) by 0 days.

(21) Appl. No.: 13/622,257

(22) Filed: Sep. 18, 2012

(65) Prior Publication Data

US 2013/0071065 A1    Mar. 21, 2013

Related U.S. Application Data

(63) Continuation of application No. 12/364,471, filed on Feb. 2, 2009, now Pat. No. 8,267,594.

(60) Provisional application No. 61/063,382, filed on Feb. 1, 2008.

(51) Int. Cl.
*G02B 6/38* (2006.01)

(52) U.S. Cl.
USPC ............... 385/59; 385/53; 385/55; 385/62

(58) Field of Classification Search
None
See application file for complete search history.

(56) References Cited

U.S. PATENT DOCUMENTS

| | | | | |
|---|---|---|---|---|
| 2,369,860 A | * | 2/1945 | Schroeder | 439/289 |
| 2,761,111 A | * | 8/1956 | Klostermann | 439/271 |
| 4,846,714 A | * | 7/1989 | Welsby et al. | 439/348 |
| 5,752,847 A | * | 5/1998 | McCormick | 439/349 |
| 5,887,099 A | * | 3/1999 | Csipkes et al. | 385/56 |
| 6,419,402 B1 | * | 7/2002 | Zimmel | 385/86 |
| 6,910,911 B2 | * | 6/2005 | Mellott et al. | 439/358 |
| 8,079,880 B2 | * | 12/2011 | Lin et al. | 439/668 |
| 2004/0002243 A1 | | 1/2004 | Mellott et al. | |
| 2004/0223702 A1 | * | 11/2004 | Mine et al. | 385/78 |
| 2008/0050072 A1 | * | 2/2008 | Durrant et al. | 385/74 |
| 2008/0089650 A1 | * | 4/2008 | Legler et al. | 385/59 |
| 2008/0100061 A1 | * | 5/2008 | Sage et al. | 285/305 |

* cited by examiner

*Primary Examiner* — Uyen Chau N Le
*Assistant Examiner* — Chad Smith

(57) ABSTRACT

Systems and methods are disclosed that include a fiber optic connection with an alignment chamber. In the alignment chamber is a first fiber optic terminal and a second fiber optic terminal coupled to the first fiber optic terminal. In addition, a securing mechanism is placed within the alignment chamber and forces the first fiber optic terminal and second fiber optic terminal together. Also in this embodiment an ejection mechanism is disclosed that ejects the first fiber optic terminal upon the removal of the securing mechanism.

20 Claims, 8 Drawing Sheets

QUICK RELEASE CONNECTION

CROSS REFERENCE TO RELATED APPLICATIONS

This application is a continuation of prior U.S. patent application Ser. No. 12/364,471, filed on Feb. 2, 2009 (now U.S. Pat. No. 8,267,594), which claims priority under 35 U.S.C. Section 119(e) to U.S. Provisional Patent Application No. 61/063,382, filed Feb. 1, 2008 which is hereby incorporated by reference.

TECHNICAL FIELD OF THE INVENTION

The present invention relates to the connections of terminals and, in particular, to creating a mechanism to quickly disconnect a set of terminal.

BACKGROUND

Many forms of communication transmission and power transmission require physical lines that connect a source terminal to a destination terminal. These physical lines are generally buried in the ground or placed above ground level. In many situations, there is no easy way to access or repair the physical line in the event that the physical line is damaged.

In some applications, such as fiber optics, a stable connection needs to be maintained between terminals. This connection requires that the terminals be properly aligned and held steady during operation. These connections are susceptible to damage caused by sudden motion.

Sudden motion may damage the physical line by pulling, tearing, or breaking the physical line. An example of sudden motion includes a traffic accident that causes the physical line to be dragged from a first location to a second location by a vehicle. In such a case, the physical line may need to be re-laid from the source to the destination. This process is time consuming, labor intensive, and expensive. In order to avoid the damage caused by sudden motion to a physical line, a quick release cable system is needed.

SUMMARY

In one embodiment, a method is disclosed that involves creating a connection between two different terminals in a connector, wherein the first terminal and second terminal are aligned. This method also includes creating a potential energy source that acts on at least one of the two terminals. In this embodiment, an inhibiting force controls the potential energy source. Also in this method, a triggering the potential energy source to separate the first and second terminal by removing the inhibiting force, wherein the potential energy released is sufficient to eject the first terminal from the connector.

In another embodiment, a system is shown that includes a connector comprising an alignment chamber; a first terminal coupled to a first cable positioned in the alignment chamber, and a second terminal coupled to a second cable positioned in the alignment chamber. The second terminal interface is perpendicular to the alignment chamber and placed where the second terminal interface is facing the first terminal interface. In addition, this system includes an ejection mechanism coupled to the first interface that is positioned to force the first terminal outside of the alignment chamber and an inhibitor that stops the ejection mechanism. A trigger is coupled to the ejection mechanism and removes the inhibitor thereby activating the ejection mechanism.

In yet another embodiment, a fiber optic connection apparatus is disclosed that includes an alignment chamber. In the alignment chamber is a first fiber optic terminal and a second fiber optic terminal coupled to the first fiber optic terminal. In addition, a securing mechanism is placed within the alignment chamber and forces the first fiber optic terminal and second fiber optic terminal together. Also in this embodiment an ejection mechanism is disclosed that ejects the first fiber optic terminal upon the removal of the securing mechanism.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

It may be advantageous to set forth definitions of certain words and phrases that may be used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller might be centralized or distributed, whether locally or remotely.

Physical cables may be used to transmit both power and information. These physical cables are generally made up of a plurality of segments connected together through junctions. In many applications, such as fiber optics, at junctions where a first terminal is connected to a second terminal, a rigid connection is required. The advantage of a rigid connection is that it promotes the connection between the first terminal and the second terminal with transmission mediums such as light, waves, or power. The disadvantage of such a connection is that any force applied to the connection may result in damage to the physical cable connected by the junction. In order to avoid damage caused by forces applied to the junction, a quick release mechanism is needed that provides the advantages of a physical connection between the first and second terminal while allowing for a quick release of the first terminal from the second terminal in the event of a force being applied to the junction.

Figure 1:
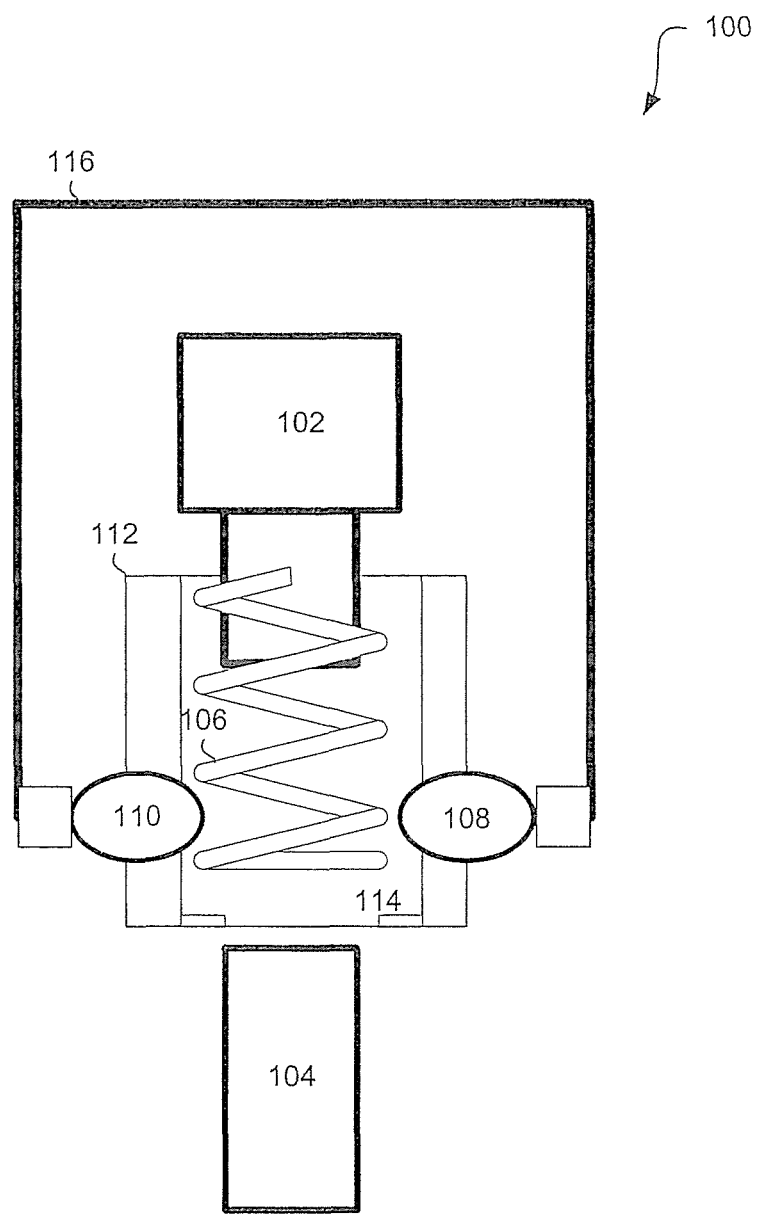
FIG. 1 is a cross section of a quick release mechanism with a relaxed spring, according to an embodiment of this disclosure.

An embodiment 100 of a quick release mechanism is depicted in FIG. 1. In FIG. 1, a first terminal 102 is shown prior to connection to the second terminal 104. A spring 106 is place in between the first terminal 102 and the second terminal 104. The first terminal 102, the second terminal 104, and the spring 106 are placed in an alignment chamber 114 within a connector 112. The first terminal 102 and the second terminal 104 may be placed partially inside of spring 106. A set of trigger mechanisms 108 and 110 are placed within the connector 112 with part of the trigger mechanisms 108 and 110 being placed within the alignment chamber 114 and outside of the connector 112. A bracket 116 is used as a trigger for triggering mechanisms 108 and 110. FIG. 1 is intended to illustrate the positions of the first terminal 102 and the second terminal 104 prior to connection within the connector 112.

In the example shown in FIG. 1, the spring 106 rests within the connector 112. When the first terminal 102 and the second terminal 104 are connected, the spring 106 is compressed storing potential energy. The trigger mechanisms 108 and 110 apply a force sufficient to inhibit the spring 106 from releasing the potential energy stored by the compression of the spring 106. The inhibiting force applied by the trigger mechanisms 108 and 110 is created by moving the trigger mechanisms 108 and 110 over the spring 106. In the event of motion being applied to the bracket 116, the triggering mechanisms 108 and 110 will be moved, thereby allowing the release of the potential energy stored in the spring 106. The sudden release of the potential energy stored in the spring 106 will result in the ejection of the first terminal 102 as will be discussed herein. It is further contemplated that the triggering mechanisms 108 or 110 may also be activated using a level sensor (e.g., the relative position of the system 100 to the ground), a motion sensor, a position sensor, or any other system or method known to one skilled in the art.

It is, therefore, contemplated that the present disclosure may use three forces. The first force is a potential force created by the compression of the spring 106. The second force is an inhibiting force created by the use of triggering mechanisms 108 and 110. The third force is an ejection force created by the release of the potential force. These forces may be orientated in any way known to one skilled in the art. For instance, in some embodiments, the inhibiting force may be a represented by a vector that is substantially perpendicular to the potential force. The present disclosure is intended to contemplate any quick release mechanism for disconnecting a first terminal from a second terminal that uses a combination of the disclosed potential, inhibiting, and ejection forces when used in the connection of the first terminal 102 to the second terminal 104.

First terminal 102 and second terminal 104 are used to connect a first cable to a second cable. It is contemplated that first terminal 102 and second terminal 104 may be used to connect any kind of cable including, but not limited to, fiber optical cables, communication cables, or power transmission cables. The first terminal 102 and the second terminal 104 may comprise a plurality of alignment pins, wherein the alignment pins allow a single connection alignment of the first terminal 102 and the second terminal 104. It is contemplated that the first terminal 102 and the second terminal 104 may promote an interface between a plurality of fiber optic connections in a single fiber optical cable.

In FIG. 1, the triggering mechanisms 108 and 110 are shown as bearings, however it is contemplated that any kind of triggering mechanism may be used, including, but not limited to, a pin, magnetic field, spring, or other device. Therefore, the present disclosure should not be limited to the use of bearings. Two separate triggering mechanisms 108 and 110 are illustrated. However, it is contemplated that any number or type of triggering mechanisms could be used, including, but not limited to magnetic triggers, mechanical triggers, or other types of triggers.

Figure 2:
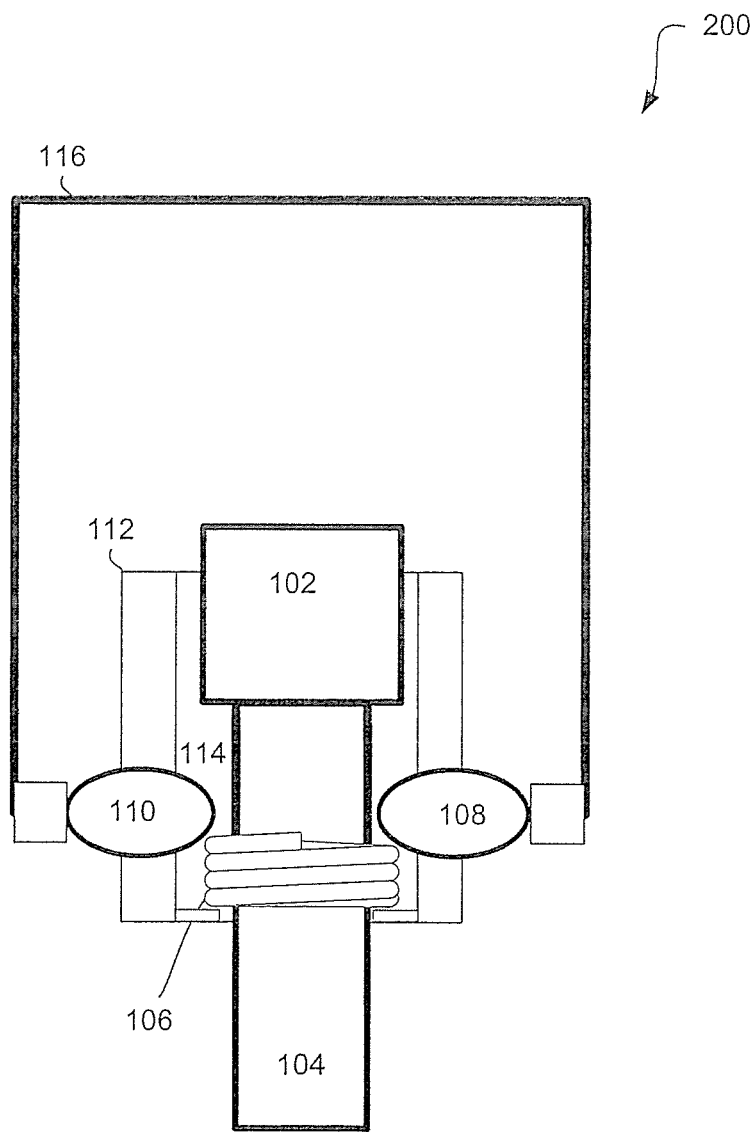
FIG. 2 is a cross section of a quick release mechanism with a compressed sting, according to an embodiment of this disclosure.

FIG. 2 is another embodiment 200 of the quick release mechanism as shown in FIG. 1 where each of the elements has been connected. In this example, the spring 106 has been compressed storing potential energy between the first terminal 102 and the second terminal 104. Additionally, in this embodiment, the first terminal 102 and the second terminal 104 have been connected. The triggering mechanisms 108 and 110 have been positioned to inhibit the spring 106 from releasing its potential energy. FIG. 2 illustrates how in one embodiment the quick release mechanism will appear after the first terminal 102 and the second terminal 104 have been placed inside of the alignment chamber 114.

Figure 3:
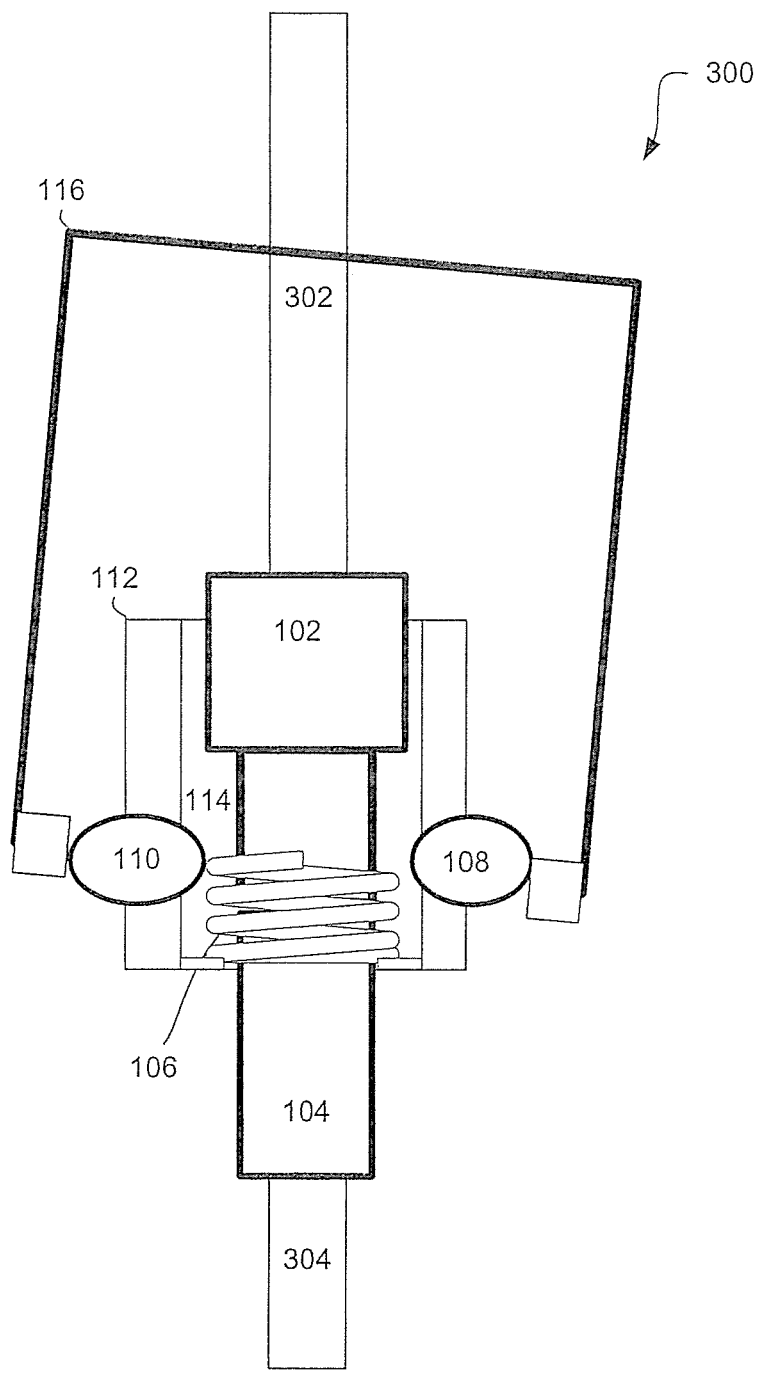
FIG. 3 is a cross section of an activated quick release mechanism, according to an embodiment of this disclosure.

FIG. 3 is an example of an embodiment 300 of the quick release mechanism in FIG. 1 after the bracket 116 has been moved to release shift the position of the triggering mechanisms 108 and 110 thereby releasing the potential energy stored in the spring 106 and ejecting the first terminal 102. In this embodiment, a cable 302 is shown connected to first terminal 102, and a cable 304 is shown connected to second terminal 104. It is understood that when the bracket 116 is shifted, the triggering mechanisms 108 and 110 similarly shift thereby releasing the potential energy from the spring 106.

Once the potential energy is released from the spring 106, the spring 106 will eject the first terminal 102 from the connector 112. This ejection may prevent damage to the cables 302 and 304, as prior to the cables being pulled, the connection between the first cable 302 and 304 is released. This quick release mechanism will prevent damage to the cables as has been previously discussed.

Figure 4:
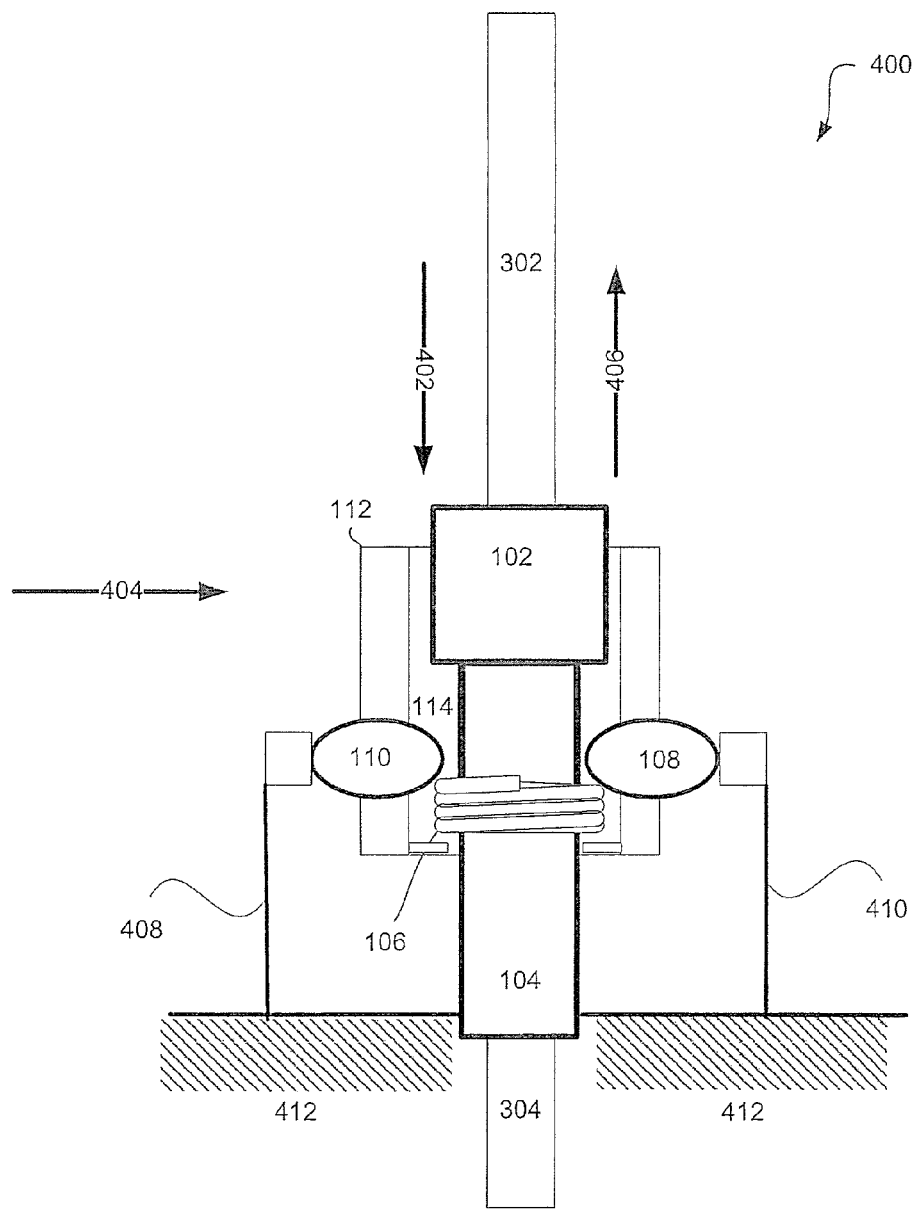
FIG. 4 is a cross section of an embodiment of the quick release mechanism, where the quick release mechanism is tethered to the ground, according to an embodiment of this disclosure.

FIG. 4 is an alternative embodiment 400 of the quick release mechanism 400, where the bracket 116 has been replaced with ground tethers 408 and 410 connected to a ground 412. In this case, if there is any shift in the quick release mechanism, the tethers 408 and 410 will trigger the triggering mechanisms 108 and 110 thereby allowing for the ejection of the first terminal 102 from the connector 112. Also shown in FIG. 4 are a potential force vector 402, inhibiting force vector 404, and an ejection force vector 406. These vectors are shown for illustrative purposes to show the relative directions of the forces previously discussed.

Figure 5:
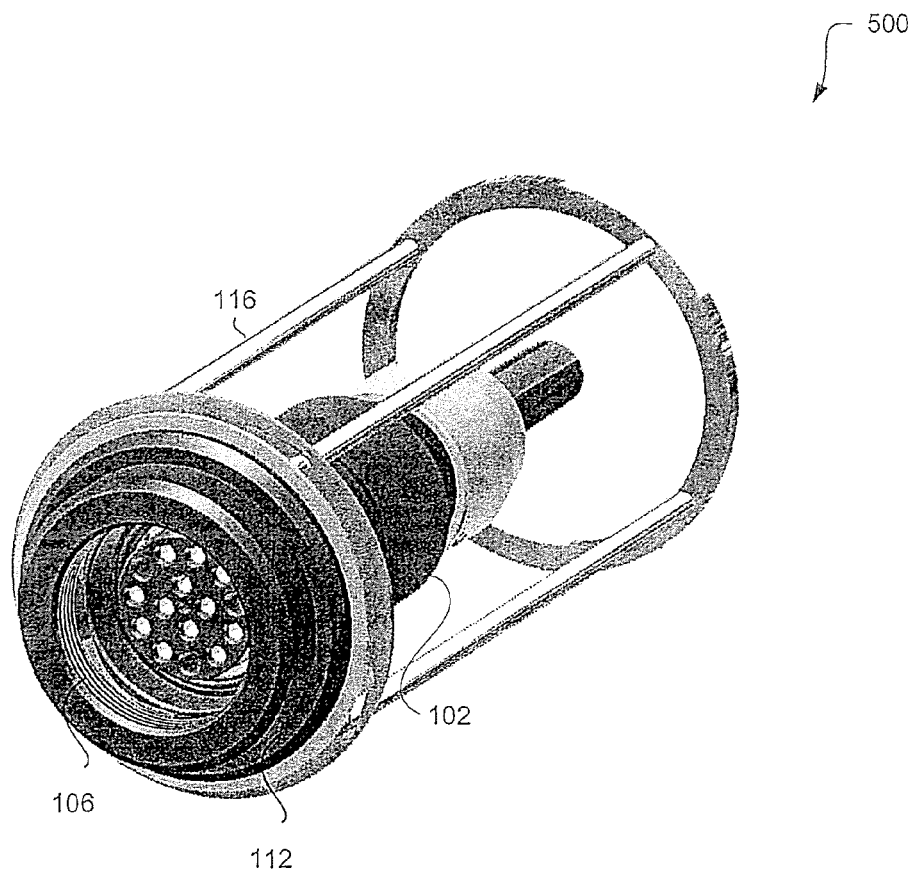
FIG. 5 is a perspective view of a first terminal, according to an embodiment of this disclosure.

FIG. 5 is an illustration 500 showing the connector 112, the first terminal 102, the bracket 116, and the spring 106. In this example, the spring has been compressed and is placed within connector 112. In this example, there are twelve openings within first terminal 102 for optical cables.

Figure 6:
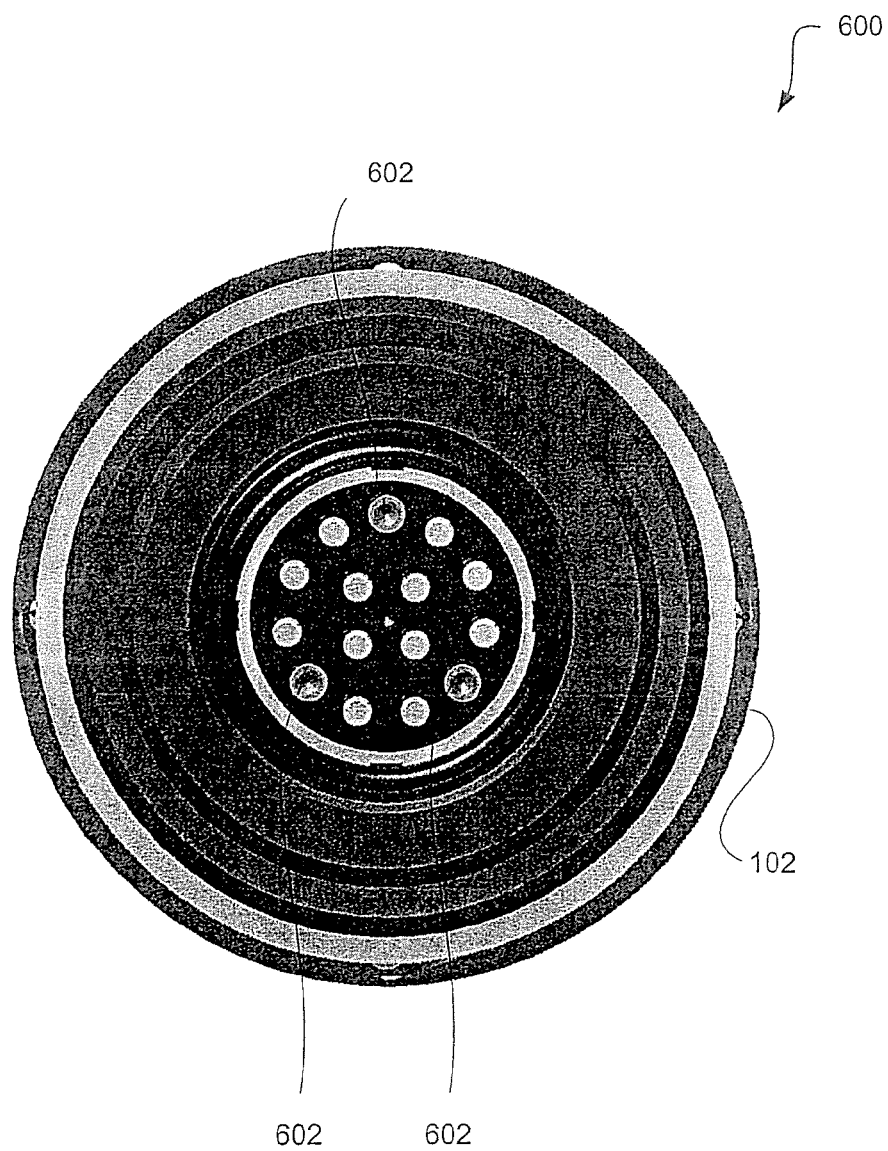
FIG. 6 is a view of the first terminal showing a plurality alignment plugs, according to an embodiment of this disclosure.

FIG. 6 is an example 600 of first terminal 102 showing alignment bolts 602. It is understood that the use of the alignment bolts 602 allow for only one type of appropriate connection orientation between first terminal 102 and second terminal 104. FIG. 6 is intended to illustrate that a proper connection may be made between a plurality of optical connections while securing and providing for appropriate alignment within each one of the twelve different connections. The use of twelve separate connections is intended to be illustrative only, as any number of connections could be made within the first terminal 102.

Figure 7:
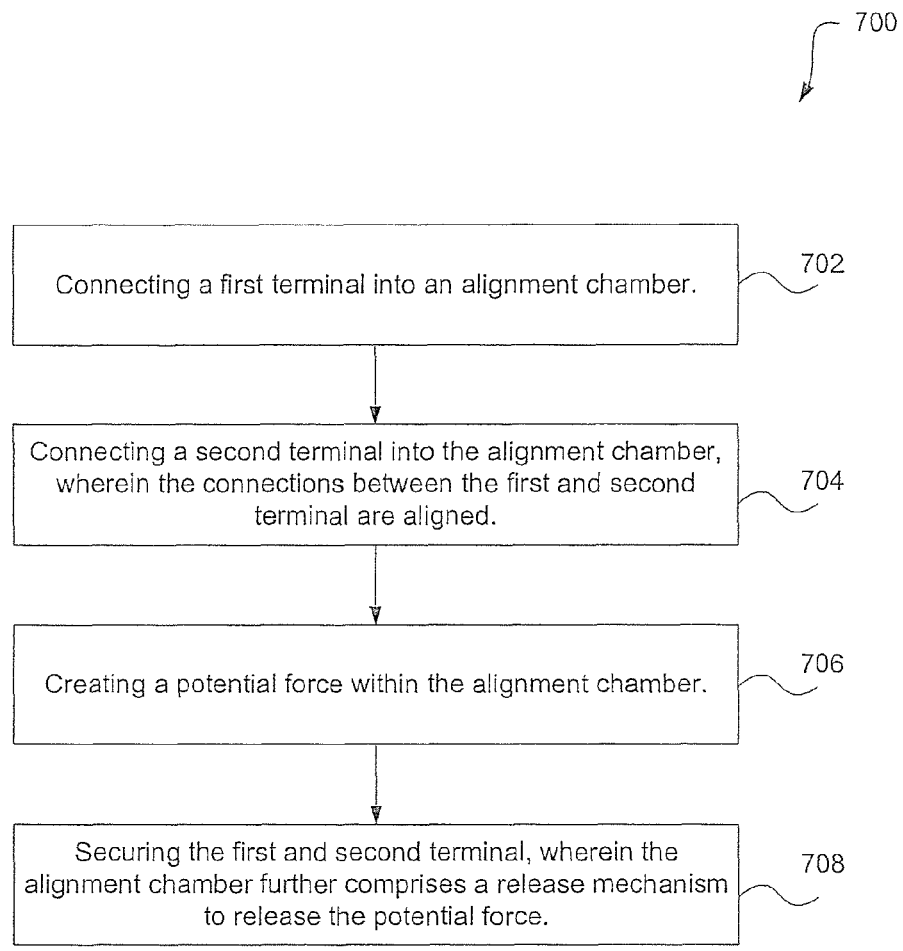
FIG. 7 is a flowchart illustrating one method of connecting a first terminal to a second terminal, according to an embodiment of this disclosure.

FIG. 7 is a flowchart 700 of one method of using the quick release apparatus. In block 702, a first terminal is connected within alignment chamber. In block 704, a second terminal is then connected within the alignment chamber where the connections between the first and second terminal are aligned. In block 706, a potential force is created between the first and second plug within the alignment chamber. In block 708, the first and second terminals are secured. There is a release mechanism to release the potential force created in block 706 located within the alignment chamber.

Figure 8:
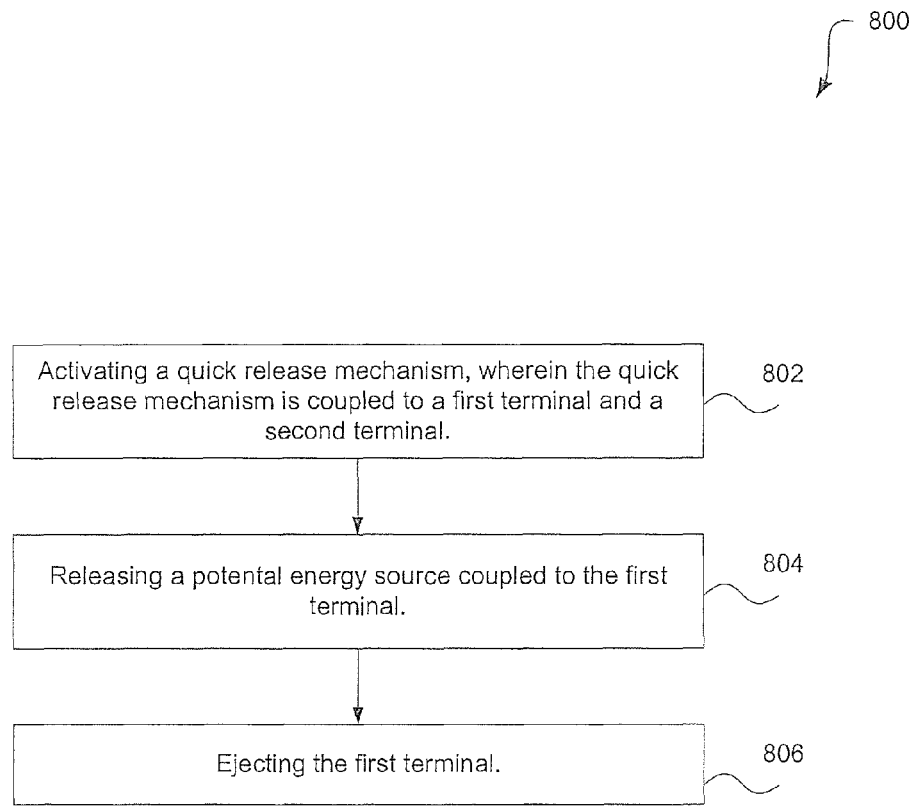
FIG. 8 is a flowchart illustrating one method of disconnecting a first terminal from a second terminal, according to an embodiment of this disclosure.

FIG. 8 is a flowchart 800 showing one method of activating the quick release mechanism. In block 802, the quick release mechanism is activated where the quick release mechanism is coupled to the first and second terminal. In block 804, at potential energy source coupled to the first terminal is released. In block 806, the first terminal is ejected from the quick release mechanism.

Although the present invention and its advantages have been described in the foregoing detailed description and illustrated in the accompanying drawings, it will be understood by those skilled in the art that the invention is not limited to the embodiment(s) disclosed but is capable of numerous rearrangements, substitutions and modifications without departing from the spirit and scope of the invention as defined by the appended claims.

What is claimed is:

1. A method, comprising:
   connecting, within an alignment connector, a first terminal of a first cable to a second terminal of a second cable;
   storing, via a potential energy source mechanism, a potential energy capable of generating an ejection force to act on at least one of the first terminal or second terminal;
   generating, via one or more triggering mechanisms, an inhibiting force to control release of the stored potential energy; and
   in response to a trigger, removing the inhibiting force to release the stored potential energy and generating the ejection force to disconnect the first terminal from the second terminal;
   wherein when the trigger is shifted, the one or more triggering mechanisms similarly shift and release the potential energy from the potential energy source mechanism;
   wherein the first terminal and the second terminal each comprise a plurality of connections; and
   wherein the first terminal and second terminal are disposed at least partially within the potential energy source mechanism.

2. The method in accordance with claim 1 wherein the inhibiting force is applied by one or more triggering mechanisms and created by moving the one or more triggering mechanisms over the potential energy source mechanism.

3. The method in accordance with claim 1 wherein the inhibiting force is substantially perpendicular to the ejection force prior to removing the inhibiting force.

4. The method in accordance with claim 1 wherein the terminal and the second terminal comprise at least one alignment pin, wherein the alignment pin is operable for aligning the first terminal and the second terminal within the alignment connector.

5. The method in accordance with claim 1 wherein the potential energy source mechanism is a single spring.

6. The method in accordance with claim 3 wherein the plurality of connections comprise fiber optic connections.

7. The method in accordance with claim 1 wherein the potential energy source mechanism comprises a spring at least partially disposed around the first terminal and the second terminal.

8. The method in accordance with claim 1 wherein upon the release of the stored potential energy, the first terminal is ejected from the alignment connector.

9. A system for quickly releasing a first connector terminal connected to a second connector terminal in response to a trigger, the system comprising:
   a connector having a chamber;
   a first connector terminal coupled to a first cable and positioned in the chamber, wherein the first terminal has a first interface perpendicular to the chamber and comprises a plurality of connections;
   a second connector terminal coupled to a second cable and positioned in the chamber, wherein the second terminal has a second interface perpendicular to the chamber and comprises a plurality of connections, the first connector terminal connected to the second connector terminal;
   an ejection mechanism operable for storing energy and generating an ejection force against the first connector terminal for disconnecting the first connector terminal from the second connector terminal and ejecting the first connector terminal from the connector, with the first terminal and the second terminal at least partially disposed inside the ejection mechanism; and
   a trigger mechanism coupled to the ejection mechanism and operable for applying an inhibiting force sufficient to inhibit release of the stored energy in the ejection mechanism and further operable for removing the inhibiting force;
   a bracket coupled to the trigger mechanism and operable for activating the trigger mechanism in response to lateral movement of the bracket and thereby removing the inhibiting force and activating the ejection mechanism to generate the ejection force; and
   wherein when the bracket is shifted, the triggering mechanism similarly shifts and releases stored energy from the ejection mechanism.

10. The system in accordance with claim 9, wherein the inhibiting force is created by moving triggering mechanism over the ejection mechanism.

11. The system in accordance with claim 9, wherein the inhibiting force is substantially perpendicular to the ejection force prior to removing the inhibiting force.

12. The system in accordance with claim 9 wherein the first connector terminal comprises a plurality of fiber optic connections.

13. The system in accordance with claim 9 wherein the ejection mechanism comprises one of a spring and a bearing.

14. The system in accordance with claim 9 wherein the triggering mechanism comprises a bearing, the ejection mechanism comprises a spring, and the bracket has a circular shape.

15. The system in accordance with claim 9 further comprising a tether coupled to the bracket.

16. The system in accordance with claim 9 wherein the trigger is at least a one of a motion sensor and a level sensor.

17. A quick-release fiber optic connector apparatus, comprising:
   an alignment chamber;
   a first fiber optic terminal coupled to a first fiber optic cable;
   a second fiber optic terminal coupled to a second fiber optic cable;
   a spring disposed within the alignment chamber and operable for generating an ejection force against the first fiber optic terminal to disconnect the first fiber optic terminal from the second fiber optic terminal in response to a release of the securing mechanism, and wherein the first fiber optic terminal and the second fiber optic terminal are disposed at least partially within the spring;

a triggering mechanism to generate an inhibiting force to control release of potential energy stored in the spring;

a sensing bracket coupled to the triggering mechanism and operable for releasing the triggering mechanism in response to lateral movement of the sensing bracket and thereby generating the ejection force; and wherein when the sensing bracket is shifted, the triggering mechanism similarly shifts and releases the potential energy from the spring.

18. The apparatus in accordance with claim 17 wherein the inhibiting force is created by moving the triggering mechanism over the spring.

19. The apparatus in accordance with claim 17 wherein the inhibiting force is substantially perpendicular to the ejection force prior to removing the inhibiting force.

20. The apparatus in accordance with claim 17 wherein the first fiber optic terminal comprises a plurality of fiber optic connections and the second fiber optic terminal comprises a plurality of fiber optic connections.

* * * * *